United States Patent
Okamura et al.

(10) Patent No.: US 8,050,317 B2
(45) Date of Patent: Nov. 1, 2011

(54) RECEIVER WITH EQUALIZER AND METHOD OF OPERATION

(75) Inventors: Hitoshi Okamura, Seongnam-si (KR); Shu-Jiang Wang, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 834 days.

(21) Appl. No.: 12/016,404

(22) Filed: Jan. 18, 2008

(65) Prior Publication Data

US 2008/0175310 A1 Jul. 24, 2008

(30) Foreign Application Priority Data

Jan. 19, 2007 (KR) .................. 10-2007-0006098

(51) Int. Cl.
*H03H 7/30* (2006.01)

(52) U.S. Cl. ........ 375/229; 375/232; 375/297; 375/344; 375/355; 375/376; 375/354; 375/327; 375/374; 375/373

(58) Field of Classification Search .................. 375/229, 375/232, 297, 344, 355, 376, 354, 327, 374, 375/373, 294
See application file for complete search history.

(56) References Cited

U.S. PATENT DOCUMENTS

| | | | |
|---|---|---|---|
| 5,237,588 A | 8/1993 | Tanaka et al. | |
| 5,991,339 A | 11/1999 | Bazes et al. | |
| 6,002,279 A | 12/1999 | Evans et al. | |
| 6,731,683 B1 | 5/2004 | Fiedler et al. | |
| 7,697,649 B2 | 4/2010 | Okamura | |
| 2005/0135468 A1* | 6/2005 | Asuri et al. | 375/232 |
| 2005/0238092 A1* | 10/2005 | Ng | 375/224 |
| 2005/0259764 A1* | 11/2005 | Hung Lai et al. | 375/317 |

FOREIGN PATENT DOCUMENTS

JP 06164316 6/1994

OTHER PUBLICATIONS

Stefanos Sidiropoulos and Mark A. Horowitz, "A Semidigital Dual Delay-Locked Loop", IEEE Journal of Solid-State Circuits, vol. 32, No. 11, Nov. 1997, pp. 1683-1692.

* cited by examiner

*Primary Examiner* — Kabir A Timory
(74) *Attorney, Agent, or Firm* — Volentine & Whitt, PLLC

(57) ABSTRACT

A receiver with an equalizer and an equalizing method are disclosed. The method includes equalizing received serial data in the equalizer, detecting an error in equalized serial data output by the equalizer, and determining reset of the equalizer in relation to an error detection.

16 Claims, 7 Drawing Sheets

Fig. 3
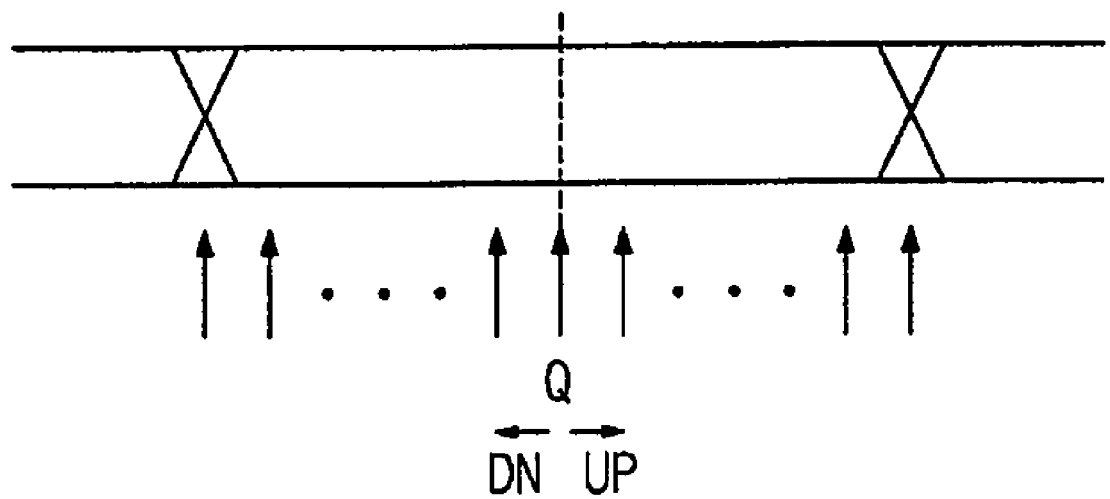
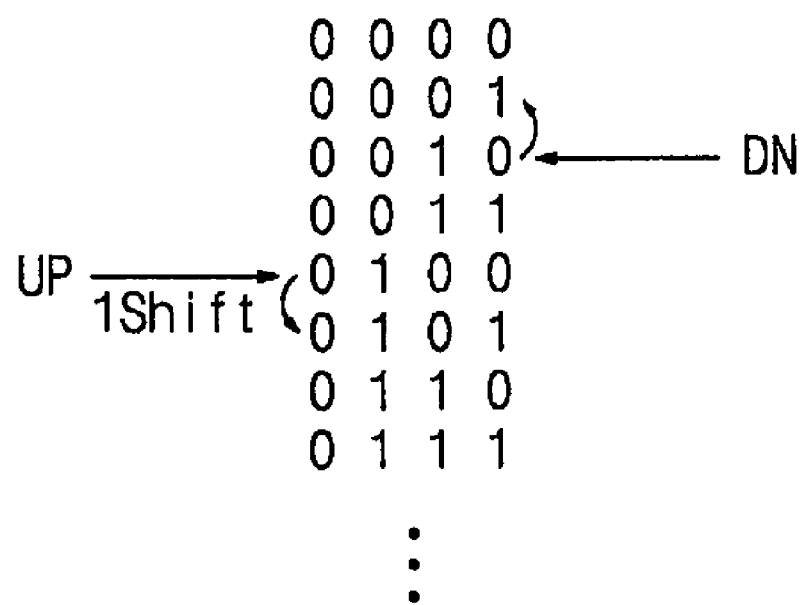

Fig. 6

| EQCTL | CODE | ECNT | EYE SIZE |
|---|---|---|---|
| 00 | 0<br>1<br>2<br>3<br>4<br>5<br>6<br>7<br>8<br>9<br>10<br>⋮<br>15 | 10<br>6<br>0 ⎫<br>0 ⎪<br>0 ⎪<br>0 ⎬ 8<br>0 ⎪<br>0 ⎪<br>0 ⎪<br>0 ⎭<br>4<br>⋮<br>19 | 8 |
| 01 | 0<br>1<br>2<br>3<br>⋮<br>14<br>15 | 10<br>9<br>0 ⎫<br>0 ⎪<br>⋮ ⎬ 14<br>0 ⎭<br>6 | 14 |
| 10 | 0<br>1<br>2<br>3<br>⋮<br>13<br>14<br>15 | 12<br>10<br>8<br>0 ⎫<br>⋮ ⎬ 12<br>0 ⎭<br>5<br>9 | 12 |
| 11 | 0<br>1<br>2<br>3<br>4<br>5<br>6<br>⋮<br>10<br>11<br>⋮ | 13<br>10<br>9<br>7<br>5<br>5<br>0 ⎫<br>⋮ ⎬ 6<br>0 ⎭<br>6<br>⋮ | 6 |

RECEIVER WITH EQUALIZER AND METHOD OF OPERATION

CROSS-REFERENCE TO RELATED APPLICATIONS

This U.S. non-provisional patent application claims priority under 35 U.S.C. §119 to Korean Patent Application No. 10-2007-0006098, filed on Jan. 19, 2007, the subject matter of which is hereby incorporated by reference.

BACKGROUND OF THE INVENTION

1. Field of the Invention

The present invention relates generally a system receiver, and more particularly, to a receiver having an equalizer and a related method of operation.

2. Description of the Related Art

Serializer and deserializer circuits (collectively or singularly SerDes) are commonly used in data communication systems. SerDes generally include a preamplifier, an equalizer, a sampler, and a clock data recovery (CDR) circuit.

SerDes recover the transmission frequency of a received data (i.e., a recovered clock signal) using the CDR circuit. The constituent sampler circuit is then operated in relation to the recovered clock signal. Accordingly, a receiver incorporating the SerDes is able to continuously receive data transmitted by a corresponding transmitter operating at a transmission frequency different from a reference clock in the receiver.

When transmitting data at high speed through a transmission line (e.g., a metal wire, or trace and associated drivers, latches, terminal, etc.), inter symbol interference (ISI) may occur due to noise associated with the transmission line. Because of ISI, the amplitude and/or phase of data bits being communicated may become highly distorted leading to bit errors in data received by the receiver. As a transmission line lengthens and as data transmission speed increases, the amplitude and/or phase of data bits in a received signal at the receiver tend to become more distorted.

Reception data integrity is always an issue in systems including SerDes, since such circuits include an interface receiving serial data having a certain amount of jitter, a particular noise component associated with the data. Data distortion is routinely measured with instrumentation showing a data "eye" having a shape and size indicative of data integrity (i.e., the manifest distinction between 1's and 0's in the data stream). Data integrity as a function of the recovered clock signal is critical to the proper operation of flip-flops or latches functionally incorporated with the receiver sampler.

The preamplifier of SerDes amplifies the voltage of the received data, and the equalizer equalizes the received data to reduce jitter in the received data, and then outputs the equalized data to the sampler.

The equalizer includes at least one control bit used to control the equalization function applied to the received data in relation to the jitter associated with the received data. That is, the equalizer may turn ON/OFF an equalizing function according to the jitter property of received data. In a case where the measured eye size of received data is small, the equalizer may increase the strength of the applied equalization function. In contrast, a large eye size may result in a reduction of applied equalization function. Thus, an adaptive equalizer may be operated to maximize eye size for the received data (i.e., improve data integrity).

However, many conventional receivers having an adaptive equalizer adjust the strength of the equalization function (hereafter, "equalizing strength") in the blind, or without regard to the actual integrity of the received data. Due to this, when ISI jitter of received data are great, the equalizing strength may be incorrectly adjusted or applied. That is, an equalizer applying an improper equalizing strength may equalize intended data of '1010' into erroneous data of '1111' or '0000'.

SUMMARY OF THE INVENTION

Embodiments of the invention provide an equalizer and related methods of operation that equalize data without over-equalization or under-equalization.

In one embodiment, the invention provides an equalizing method adapted for use in a receiver incorporating an adaptive equalizer, the method comprising; equalizing received serial data in the equalizer, detecting an error in equalized serial data output by the equalizer, and determining reset of the equalizer in relation to an error detection.

In another embodiment, the invention provides a receiver comprising; an equalizer receiving serial data and providing equalized serial data, an eye size measuring circuit configured to measure a size of an eye pattern associated with the equalized serial data, and an error detector configured to detect an error in the equalized serial data, wherein the equalizer is configured to adaptively adjust an equalizing strength applied to the serial data in accordance with the size of the eye pattern and to be reset in accordance with the detected error.

BRIEF DESCRIPTION OF THE FIGURES

FIG. 3 is a conceptual diagram illustrating operations of a clock data recovering circuit according to an embodiment of the present invention;

FIG. 6 is a table illustrating relationship between a digital code value for shifting a recovery clock, the number of errors, an eye size, and a control bit value of an equalizer according to an embodiment of the present invention.

DESCRIPTION OF EMBODIMENTS

Hereinafter, exemplary embodiments of the invention will be described with reference to the accompanying drawings.

Figure 1:
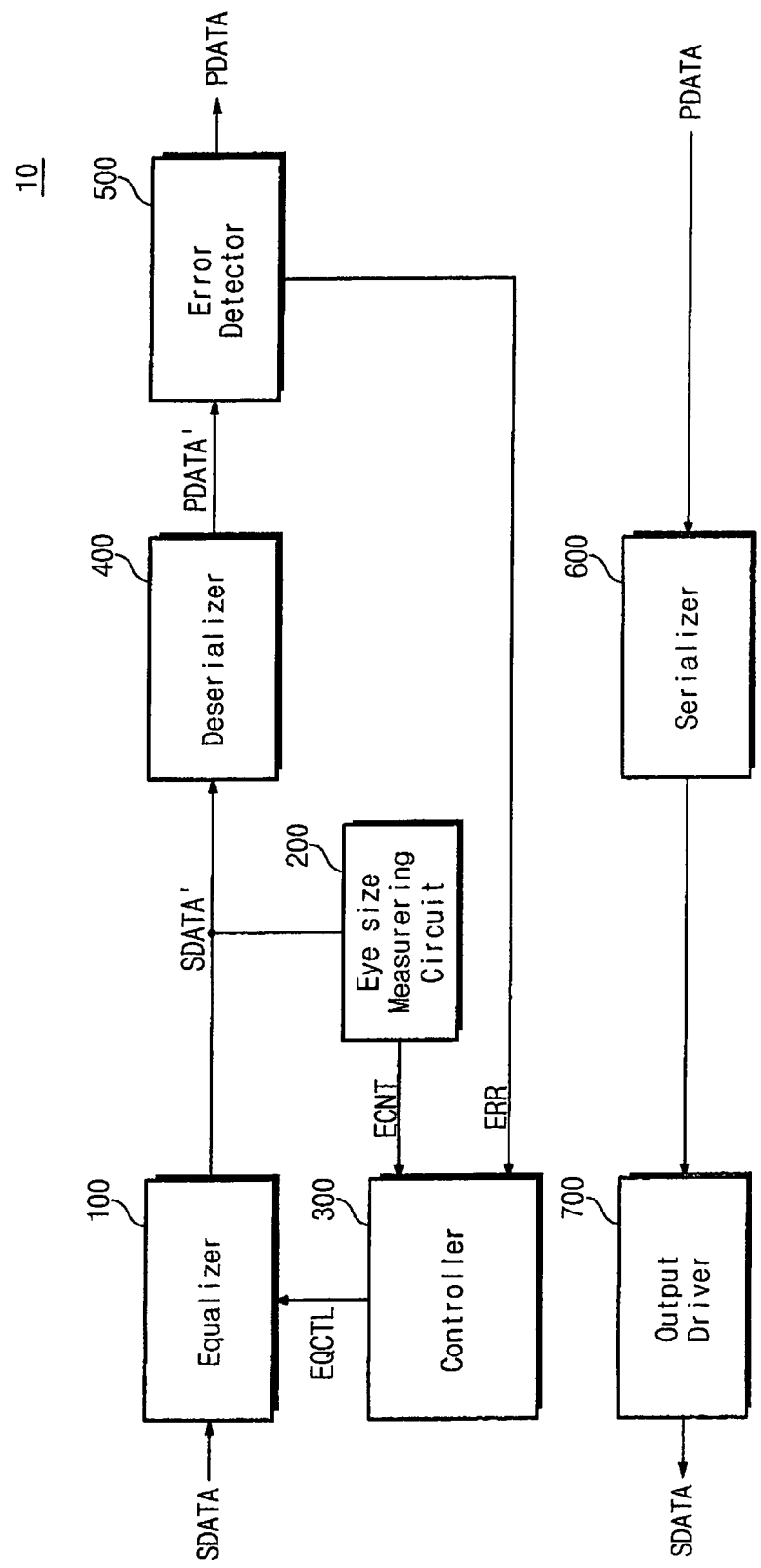
FIG. 1 is a block diagram of a receiver according to an embodiment of the present invention.

FIG. 1 is a block diagram of a receiver 10 according to an embodiment of the invention. Referring to FIG. 1, receiver 10 includes an equalizer 100, an eye size measuring circuit 200, a controller 300, a deserializer 400, an error detector, a serializer 600, and an output driver 700.

Receiver 10 adjusts equalizing strength in accordance with the size of an eye pattern provided by eye size measuring circuit 200. The equalizing strength corresponding to the size of the eye pattern is adjusted according to a control signal EQCTL provided by the controller 300. Additionally, receiver 10 determines whether or not equalizer 100 is reset in response to an error signal ERR provided by error detector 500. Controller 300 delivers the control signal EQCTL for resetting equalizer 100 to equalizer 100 in response to an error signal ERR.

Equalizer 100 compensates any amplitude or phase distortions in the received serial data SDATA in response to the control signal EQCTL. Specifically, equalizer 100 amplifies the voltage of the received data SDATA, and equalizes the amplified data to compensate for jitter in the received data SDATA. As noted above, jitter is distortion of a signal due to inter symbol interference (ISI). Equalized serial data SDATA' is thus provided to deserializer 400 to be converted into a parallel data PDATA'.

Eye size measuring circuit 200 measures the size of an eye pattern associated with equalized serial data SDATA' provided by equalizer 100. The measured size of the eye pattern is provided to controller 300 in the form of eye pattern signal ECNT. Eye size measuring circuit 200 will be described in some additional detail hereafter with reference to FIG. 2.

Controller 300 receives the size pattern signal ECNT from eye size measuring circuit 200 and the error signal ERR from error detector 500 to generate control signal EQCTL applied to equalizer 100. The control signal EQCTL is a signal that determines any adjustment made to the equalizing strength applied by equalizer 100, and whether or not the equalizer is reset.

Deserializer 400 deserializes the equalized serial data SDATA' received from equalizer 100. The deserialized parallel data PDATA' is data that parallelizes the sampled equalized serial data SDATA' in a defined 1 to n ratio. The deserialized parallel data PDATA' is then provided to error detector 500.

Error detector 500 determines whether one or more errors has occurred in the parallel data PDATA'. In one embodiment, error detector 500 may use a conventional 8B10B circuit to detect error(s) in the deserialized parallel data PDATA'. Under this assumption, it is now assumed that the serial data SDATA received by receiver 10 is encoded using a conventional 8B10B encoding method. The 8B10B circuit in error detector 500 converts the received 8-bit data into 10-bit data, and determines whether or not the converted 10-bit data is listed in an 8B10B coding list. If the converted 10-bit data is not listed in the 8B10B coding list, error detector 500 generates the error signal ERR to indicate this condition.

Error detector 500 may use, for example, cyclical redundancy check (CRC). CRC uses a cyclical binary symbol to detect errors that occur during data communication, and is highly efficient in detecting errors because a cyclical symbol is used. If CRC is employed in an embodiment of the invention, corresponding encoder/decoder circuits may be realized using conventionally understood techniques and designs.

Error detector 500 provides output data PDATA when no error is detected.

In certain embodiments of the invention, receiver 10 may be associated with a transmitter. Thus, in the illustrated embodiment, serializer 600 may be used to parallel output data PDATA from an internal transceiver source and serializes it. Output driver 700 then amplifies the serialized data provided by serializer 600 prior to communication of the corresponding serial data SDATA. In certain embodiments of the invention, a transceiver incorporating the foregoing circuitry may also comprises a conventional pre-emphasis driver (not shown) to transmit a pre-emphasized version of the serial data SDATA with a predetermined pre-emphasis strength.

Receiver 10 adjusts the equalizing strength in relation to the eye pattern signal ECNT, and determines whether or not equalizer 100 is reset in response to the error signal ERR. When the eye size measured by eye size measuring circuit 200 of the receiver 10 is substantially optimum (said optimum conditions being a matter of system design), the current communication system settings are regarded as providing an optimized equalizing condition. However, even under an optimized equalizing condition, equalizer 100 may be reset by the error signal ERR provided by error detector 500 upon detecting an error in the parallel data PDAT'. Therefore, equalizer 100 may be operated to provide an optimized equalizing condition and maintain corresponding system settings.

Figure 2:
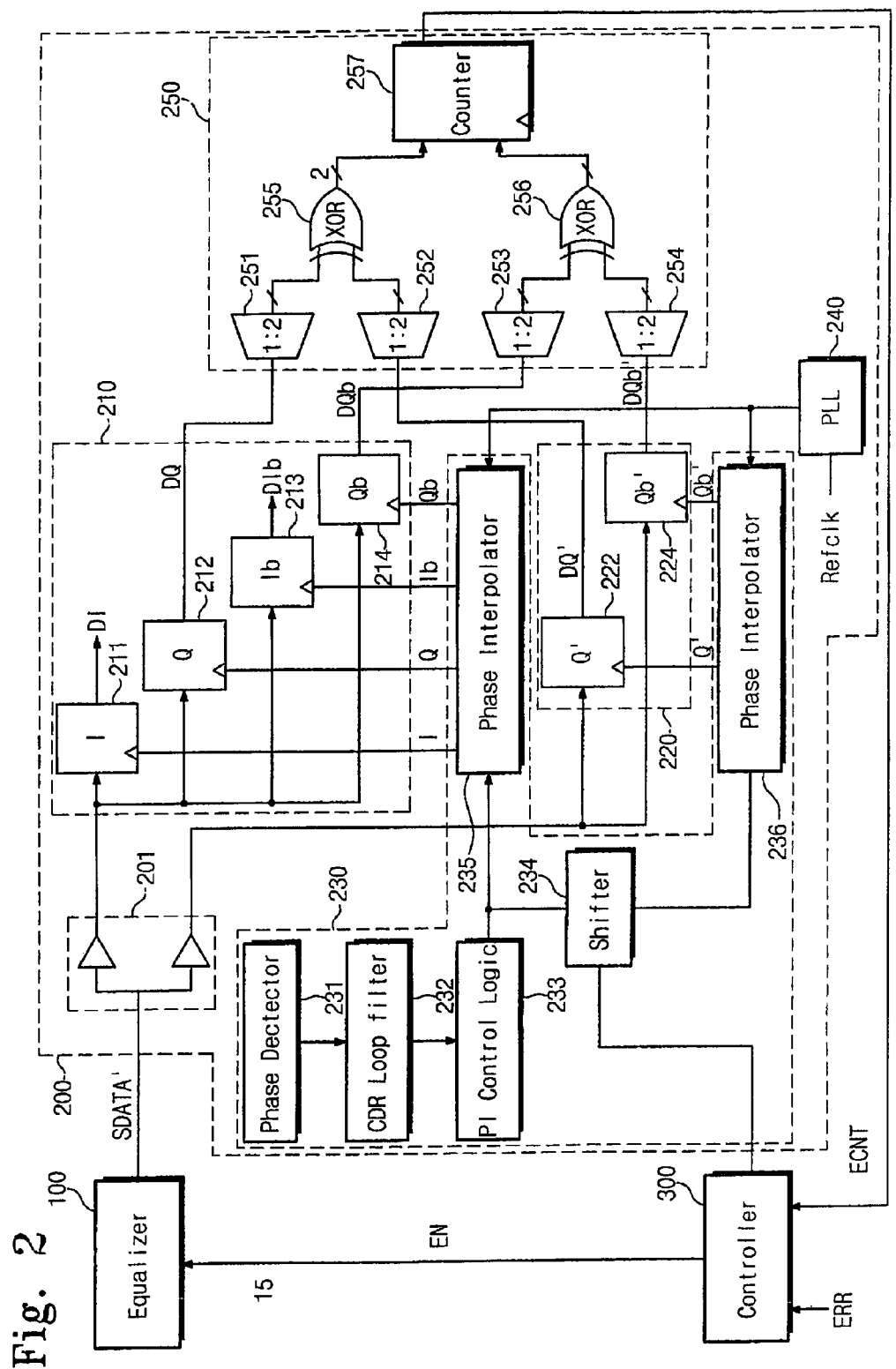
FIG. 2 is a circuit diagram of an eye size measuring circuit according to an embodiment of the present invention.

FIG. 2 is a circuit diagram of eye size measuring circuit 200 according to an embodiment of the invention. Referring to FIG. 2, eye size measuring circuit 200 includes a first sampling circuit 210, a second sampling circuit 220, a clock data recovering circuit 230, a phase locked loops (PLL) 240, and an error counter circuit 250.

Referring to FIG. 2, a buffer circuit 201 is disposed between the first and second sampling circuits 200. Buffer circuit 201 buffers the output of equalizer 100 to deliver it to first and second sampling circuits 210 and 220. Here, buffer circuit 201 may not be used. That is, the output of equalizer 100 may be directly provided to first and second sampling circuits 210 and 220.

First sampling circuit 210 includes an I flip-flop 211, a Q flip-flop 212, an Ib flip-flop 213, and a Qb flip-flop 214. First sampling circuit 210 is synchronized in relation to a plurality of recovery clocks I, Q, Ib, and Qb provided by an interpolator 235 of clock data recovering circuit 230 and samples the equalized serial data SDATA' provided by equalizer 100 to provide applied flip-flop data DI, DQ, DIb, and DQb, respectively.

Second sampling circuit 220 synchronizes the serial data SDATA (or the serial data provided by the buffer circuit) provided by equalizer 100 with phase clocks Q' and Qb' scanned within a predetermined range of a second phase interpolator 236 to provided sampled data DQ' and DQb'.

Clock data recovering circuit 230 includes a phase detector 231, a CDR loop filter 232, a PI control logic 233, a shifter 234, and first and second phase interpolators 235 and 236. Clock data recovering circuit 230 generates a plurality of recovery clocks I, Ib, Q, and Qb from the received serial data SDATA in relation to parallel data PDATA' provided by deserializer 400 and a plurality of clock signals provided by PLL 240. In an alternate embodiment, clock data recovering circuit 230 may use the sampled data DI, DQ, Dib, and DQb of first sampling circuit 210 instead of the parallel data PDATA'.

Clock data recovering circuit 230 feeds back the output of clock data recovering circuit 230 to first sampling circuit 210. Through these repetitive recovery operations, clock data recovering circuit 230 recovers the clock and data contents of received serial data SDATA.

FIG. 3 is a conceptual diagram illustrating an exemplary operation of the clock data recovery circuit according to an embodiment of the invention. Referring to FIG. 3, clock data recovering circuit 230 operates CDR loop filter 232, PI control logic 233, and phase interpolator 235 to place the recovery clock Q and the recovery clock Qb, i.e., outputs of first phase interpolator 235, on the middle of data.

Phase detector 231 detects phases of the sampled data DI, Dib, DQ, and DQb provided by first sampling circuit 210 or the deserialized parallel data PDATA' provided by deserializer 400 to output an UP signal or a DOWN signal. For example, assume that a frequency of the equalized serial data SDATA' is "f", and deserializer 400 performs deserialization ay a 1 to n ratio. Under these assumptions, when phase detector 231 receives the sampled data DI, DIb, DQ, and DQb provided by first sampling circuit 210 (as opposed to parallel data output by deserializer 400), phase detector 232, CDR loop filter 232, and PI control logic 233 operate in relation to a clock frequency of f/2. CDR loop filter 232 generates an UP command or a DOWN command in correspondence to an UP/DOWN signal.

PI control logic 233 receives the UP/DOWN command from CDR loop filter 232 to generate a digital code value. Here, the UP/DOWN command may use a 1-bit value, such that 1 represents the UP command and 0 represents the DOWN command. For example, assuming a 4-bit digital code value, the phase of the output clock in the first phase interpolator 235 may be changed by about 22.5° (about 360°/16) using a digital code value of 0000 or 1111.

Referring to FIG. 3, PI control logic 233 increases a digital code value by 1 when receiving the UP command, and decreases it by 1 when receiving the DOWN command.

Figure 4:
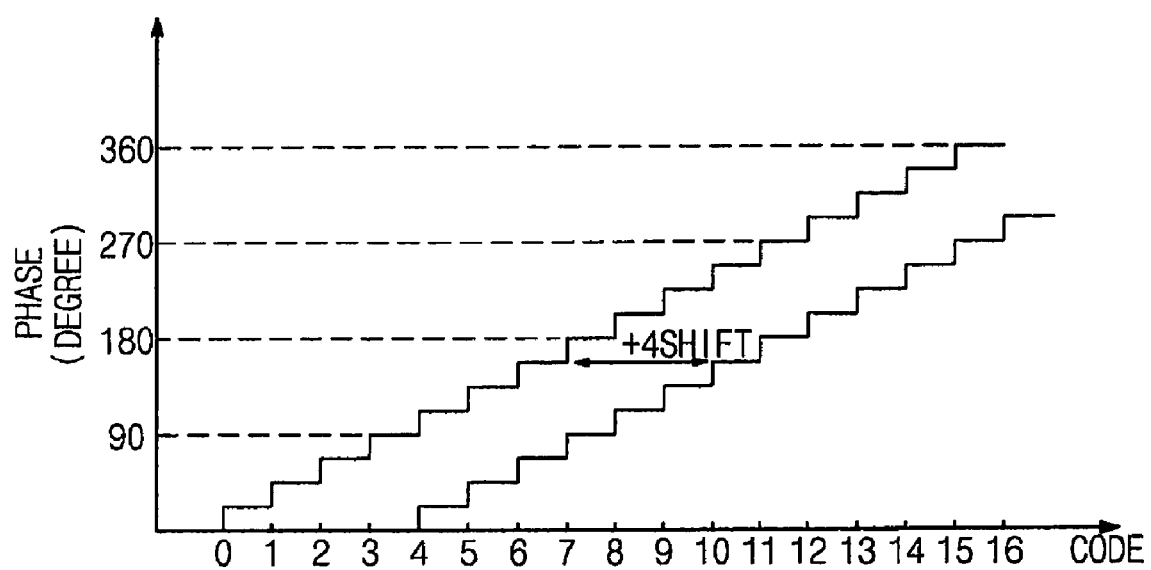
FIG. 4 is a graph illustrating relationship between a digital code and a clock phase according to an embodiment of the present invention.

FIG. 4 is a graph illustrating relationship between a digital code and a clock phase according to an embodiment of the invention. Referring to FIG. 4, when the digital code value is shifted four times, the phase of a recovery clock in the first phase interpolator 235 increases or decreases by about 90° (about 22.5°×4).

First phase interpolator 235 receives four clocks of about 0°/90°/180°/270° from PLL 240, and then increases or decreases phases of the four clocks of about 0°/90°/180°/270° in response to the digital code value from PI control logic 233.

Shifter 234 sequentially shifts a bit value of an output digital code in PI control logic 233 to deliver it to second phase interpolator 236. The shifted digital code has a code value that shifts a phase corresponding to the digital code value of PI control logic 233 within an about ±180° range.

Figure 5:
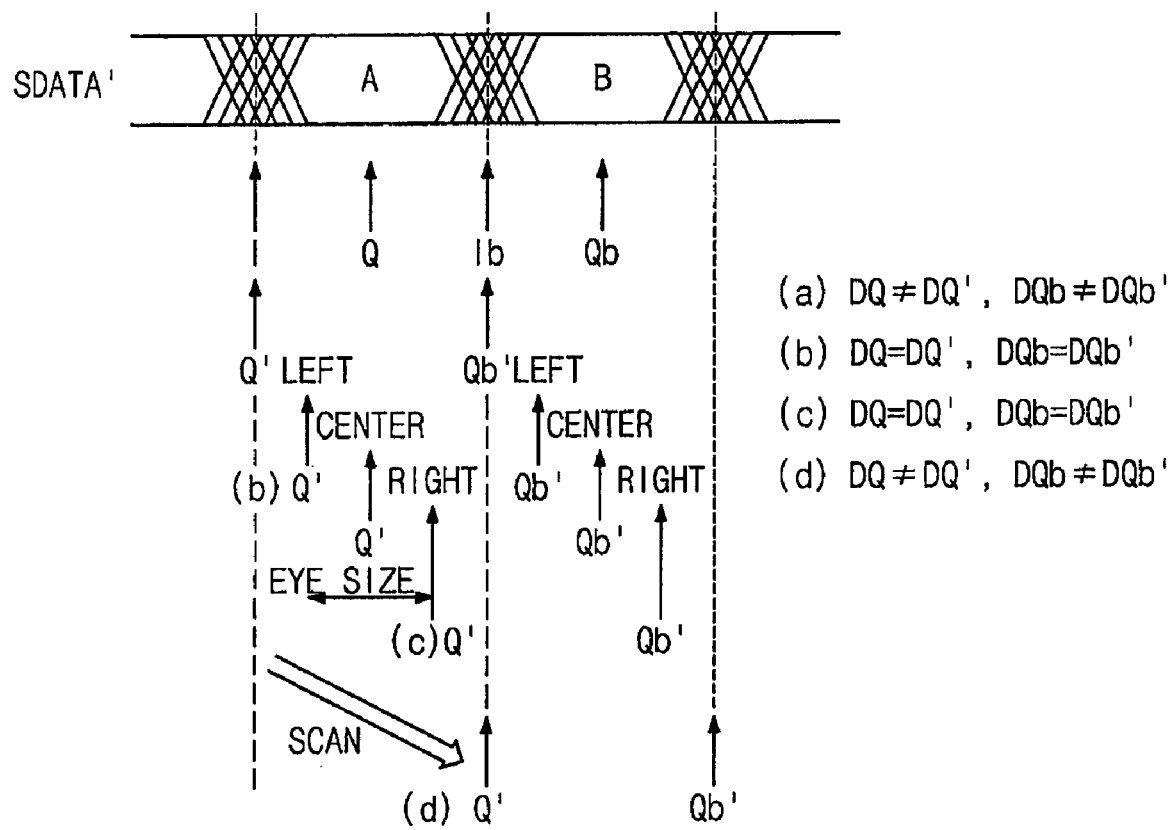
FIG. 5 is a conceptual diagram illustrating a method for measuring the size of an eye pattern according to an embodiment of the present invention.

FIG. 5 is a conceptual diagram illustrating one exemplary method of measuring the size of an eye pattern according to an embodiment of the invention. Referring to FIG. 5, second phase interpolator 236 receives the output clocks of about 0°/90°/180°/270° of the PLL 240 and the digital code value shifted by shifter 235 to generate the shift phase clocks Q' and Qb' having a sequentially-shifted phase within an about ±180° range at most with respect to the recovery clocks I, Q, Ib, and Qb generated in first phase interpolator 235. That is, shifter 234 and second phase interpolator 236 generate the shift phase clocks Q' and Qb' that are shifted by a predetermined phase with respect to the recovery clock of the clock data recovering circuit 230. Second phase interpolator 236 sequentially scans the shift phase clocks Q' and Qb' up to about ±180° with respect to the phases of the recovery clocks Q and Qb generated in first phase interpolator 235.

Referring to FIG. 5, eye size measuring circuit 200 compares the data DQ' and DQb' with the data DQ and DQ. The data DQ' and DQb' are sampled by synchronizing the equalized serial data SDATA' provided by equalizer 100 with the shift clocks Q' and Qb' output from second phase interpolator 236. The data DQ and DQb are sampled by synchronizing the equalized serial data SDATA' provided by equalizer 100 with the recovery clocks Q and Qb of first phase interpolator 235.

Additionally, eye size measuring circuit 200 determines whether or not the sampled data DQ' are identical to the sampled data DQ and also the sampled data DQb' are identical to the sampled data DQb, calculates a number of errors, and communicate the number of errors in eye pattern signal ECNT. Controller 300 calculates the size of the eye pattern by using the number of errors indicated by system pattern signal ECNT provided by eye size measuring circuit 200.

Error counter circuit 250 includes four 1 to 2 de-multiplexers 251 through 254, data comparators 255 and 256, and counter 257. Data comparators 255 and 256 may be implemented using XOR gates.

Error counter circuit 250 respectively compares the sampled data DQ and DQb of first sampling circuit 210 with the sampled data DQ' and DQb' of second sampling circuit 220 to calculate the number of errors. Referring to FIG. 5, error counter circuit 250 determines whether or not data DQ and DQb are identical to data DQ' and DQb'. The data DQ and DQb are sampled by synchronizing with the recovery clocks Q and Qb located in the middle of the equalized serial data SDATA'. The data DQ' and DQb' are sampled by synchronizing with the shift phase clocks Q' and Qb' that are sequentially scanned up to about ±180° with respect to a phase of the recovery clocks Q and Qb.

Referring to FIG. 5, in cases (a) and (c) where the shift phase clock Q' has a phase of about −180° or about +180° with respect to a phase of the recovery clock Q, values of the data DQ' and DQb' sampled by synchronizing with the shift phase clocks Q' and Qb' are included in a jitter component of the equalized serial data SDATA'. Accordingly, values of the data DQ' sampled by synchronizing with the shift phase clock Q' are different from values of the data DQ sampled by synchronizing with the recovery clock Q, and also values of the data DQb' sampled by synchronizing with the shift phase clock Qb' are different from values of the data DQb sampled by synchronizing with the recovery clock Qb.

When the shift phase clock Q' is located on the left of the recovery clock Q, i.e., a case (a) where the shift phase clock Q' has a specific phase between about −180° and about 0° with respect to a phase of the recovery clock Q, values of the data DQ' and DQb' sampled by synchronizing with the shift phase clocks Q' and Qb' are not included in the jitter component of the equalized serial data SDATA'. Accordingly, values of the data DQ' sampled by synchronizing with the shift phase clock Q' are identical to values of data DQ sampled by synchronizing with the recovery clock Q, and also values of the data DQb' sampled by synchronizing with the shift phase clock Qb' are identical to values of data DQb sampled by synchronizing with the recovery clock Qb.

When the shift phase clock Q' is located to the right of the recovery clock Q, i.e., a case (b) where the shift phase clock Q' has a specific phase between about 0° and about +180° with respect to a phase of the recovery clock Q, values of the data DQ and DQb sampled by synchronizing with the shift phase clocks Q' and Qb' are not included in a jitter component of the equalized serial data SDATA'. Accordingly, values of the data DQ' sampled by synchronizing with the shift phase clock Q' are identical to values of data DQ sampled by synchronizing with the recovery clock Q, and also values of the data DQb' sampled by synchronizing with the shift phase clock Qb' are identical to values of data DQb sampled by synchronizing with the recovery clock Qb.

Referring to FIG. 3, the data DQ and DQ' sampled by first sampling circuit 210 are demultiplexed using a 1 to 2 ratio by each of de-multiplexer 251 and 253, and then applied to XOR gates 255 and 256. The data DQ' and DQb' sampled by second sampling circuit 220 are demultiplexed using a 1 to 2 ratio by each of de-multiplexer 252 and 254, and then applied to XOR gates 255 and 256.

XOR gate 255 outputs 1 when the data DQ sampled by first sampling circuit 210 are different from the data DQ' sampled by second sampling circuit 220, and outputs 0 if not. On the other hand, XOR gate 256 outputs 1 when the data DQb sampled by first sampling circuit 210 are different from the data DQb' sampled by second sampling circuit 220, and outputs 0 if not.

Table 1 shows a digital code value for shifting a recovery clock and the number of errors.

TABLE 1

| | CODE | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| ECNT | 32 | 21 | 4 | 0 | 0 | 0 | 0 | 0 | 0 | 0 | 0 | 0 | 0 | 6 | 19 | 32 |

Referring to Table 1, the number of errors ECNT indicated by the eye pattern signal shifts a digital code value several times to sequentially shift the shift phase clocks Q' and Qb'. The sum of the outputs of the XOR gate is shown.

For example, the phases of the shift phase clocks Q' and Qb' corresponding to a case where the digital code value is 0, i.e., 0000, are about 180° with respect to the recovery clocks Q and Qb, respectively, and in this case, the number of errors ECNT measured several times is 32.

The phases of shift phase clocks Q' and Qb' corresponding to a case where the digital code value is 1, i.e., 0001, are about −167.5°, respectively, with respect to the recovery clocks Q and Qb and in this case, the number of errors ECNT measured several times is 21.

The phases of shift phase clocks Q' and Qb' corresponding to a case where the digital code value is 3 through 12, i.e., 00011 through 1100, are about −112.5° through about +112.5°, respectively, with respect to the recovery clocks Q and Qb and in this case, the number of errors ECNT measured several times is 0. Values of the digital code 405 with which the number of errors is 0 are 3 through 12, and that is, the size of an eye pattern of the received data represents the size between about −112.5° and about +112.5° in an aspect of a phase. In this case, the size of the eye pattern is about 225°.

Referring to FIG. 2, controller 300 receives the eye pattern signal indicating the number of errors ECNT from error counter circuit 250 to calculate the eye size associated with the equalized serial data SDATA'. Controller 300 generates a control signal EQCTL to adjust the equalizing strength of equalizer 100 according to the size of the eye pattern. It is assumed that the control signal EQCTL is a 4-bit control bit for convenience of description below. Thereafter, controller 300 delivers this type of control bit value as control signal EQCTL to equalizer 100.

With this set of working assumptions in mind, FIG. 6 is a table illustrating relationship between a digital code value for shifting a recovery clock, the number of errors, an eye size, and a control bit value of an equalizer according to an embodiment of the invention.

Controller 300 delivers control bit values (e.g., 00, 01, 10, and 11) to equalizer 100, and measures the size of the eye pattern with respect to each of the control bit values. Here, the number of errors ECNT is measured several times with respect to each of the control bit values. For example, in a case where the control bit value is 00 and the digital code value is 0, the number of errors ECNT is 10 when measuring the number of errors 50 times. In a case where the control bit value is 00 and the digital code value is 2, the number of errors ECNT is 0 when measuring the number of errors 50 times.

Controller 300 may store the size of the measured eye pattern in a memory or register. Additionally, the digital code value, the number of errors, the eye size, and the control bit value may be stored in a memory or register associated with (internally or externally) controller 300.

Referring to FIG. 6, when a control bit value is 00, the size of the eye pattern is 8, and also when a control bit value 01, the size of the eye pattern is 14. When a control bit value is 10, the size of the eye pattern is 12, and when a control bit value 111 the size of the eye pattern is 6. That is, when the bit value is 01, the size of the eye pattern has the maximum value 14. Here, 1 in the size of the eye pattern represents a phase difference of about 22.5° when using a 4-bit digital code. Accordingly, controller 300 sets the control bit value to be 01 and provides it to equalizer 100. Accordingly, equalizer 100 adjusts the strength of an equalization function applied to serial data SDATA to obtain the maximum pattern size in response to a control bit value 01.

Figure 7:
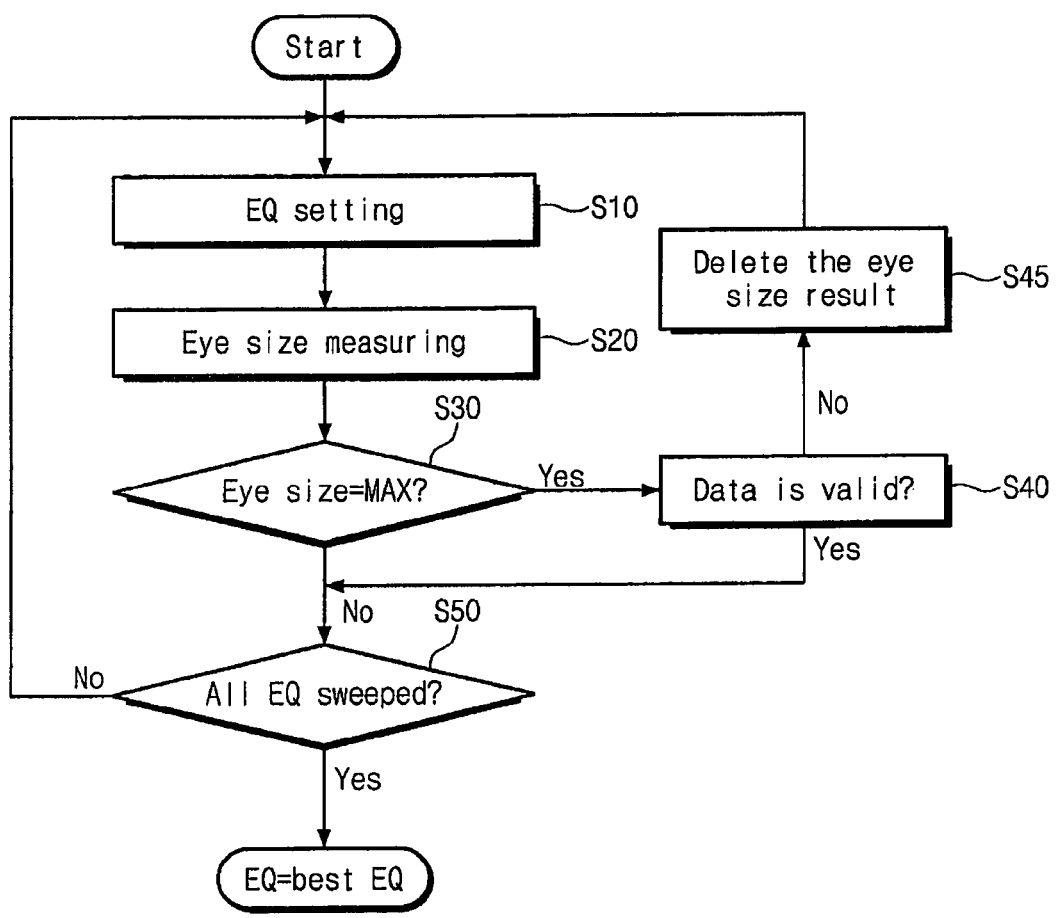
FIG. 7 is a flowchart illustrating an equalizing method an equalizer according to an embodiment of the present invention.

FIG. 7 is a flowchart summarizing an exemplary equalizing method for use in relation to an equalizer according to an embodiment of the invention. Referring to FIGS. 1 and 7, the equalizing method operates in relation to a detected the size of an eye pattern and related data error(s).

In operation S10, equalizer 100 is set in response to the control signal EQCTL. Equalizer 100 equalizes serial data SDATA and provides equalized serial data SDATA' in response to an initial control signal EQCTL provided by controller 300.

In operation S20, the size of the eye pattern is measured. Eye size measuring circuit 200 determines the number of errors ECNT in order to measure the eye size of the equalized serial data SDATA' provided by equalizer 100. Controller 300 receives the number of errors ECNT from eye size measuring circuit 200 to calculate the size of the eye pattern.

In operation S30, it is determined whether the eye pattern is optimized (e.g., maximized MAX) or not. Controller 300 compares the size of the calculated eye pattern with the stored maximum eye pattern to determine whether the eye pattern is maximized or not. Or, controller 300 repeatedly compares the size of the eye pattern with the size of the stored eye pattern to determine the maximum value of the eye pattern size.

In operation S40, once the size of the measured eye pattern is maximized, it is determined whether the data has been effectively received. Error detector 500 detects errors in the parallel data PDATA' and provides an error signal ERR to controller 300. Controller 300 determines whether equalizer 100 is reset or not in response to the error signal ERR. If an error is detected, the method proceeds to operation S45. On the other hand, if no error is detected, the method proceeds to operation S50.

In operation S45, controller 300 deletes the size of the measured eye pattern. Then, controller 300 generates the control signal EQCTL for resetting equalizer 100 and provides it to equalizer 100.

In operation S50, when the size of the eye pattern is not maximized, it is determined whether or not the equalizing strength is adjusted with respect to all equalizing conditions. If all the equalizing conditions are not used, the control signal EQCTL corresponding to a new equalizing condition is provided to equalizer 100. On the other hand, if all the equalizing conditions are used, controller 300 determines the current equalizing conditions as the optimized equalizing condition, and generates a corresponding control signal EQCTL and provides it to equalizer 100.

Thus, receiver 10 detects data error(s) and resets equalizer 100, such that malfunction of equalizer 100 can be prevented. Additionally, receiver 10 measures the eye pattern of data output from equalizer 100 to adjust the equalizing strength according to the size of the measure eye pattern.

Receiver 10 includes an adaptive equalizer that is adjustable in relation to the size of the eye pattern, but such adjustment may not always be necessary. Receiver 10 may include on or more equalizers of various design and functionality. Receiver 10 detects errors in data output from the one or more equalizer(s) to determine whether or not a particular equalizer should be reset. Accordingly, the receiver may perform an equalizing operation more accurately.

According to embodiments of the invention, a receiver measures the size of an eye pattern to effectively reset a constituent equalizer without malfunction according to adjustment of an equalizing strength and data errors.

The above-disclosed subject matter is to be considered illustrative, and not restrictive, and the appended claims are intended to cover all such modifications, enhancements, and other embodiments, which fall within the scope of the invention. Thus, to the maximum extent allowed by law, the scope of the invention is to be determined by the broadest permissible interpretation of the following claims and their equivalents.

What is claimed is:

1. An equalizing method adapted for use in a receiver incorporating an adaptive equalizer, the method comprising:
    equalizing received serial data in the adaptive equalizer by first sampling the equalized serial data in synchronization with at least one of a plurality of recovery clocks having respectively different phases, wherein the plurality of recovery clocks are recovered from the equalized serial data, and shifting the at least one of the plurality of recovery clocks within a predetermined phase range in synchronization with at least one shift phase clock to perform a second sampling of the equalized serial data;
    measuring a size of an eye pattern associated with the equalized serial data and generating a corresponding eye pattern signal comparing the first sampling with the second sampling and calculating a corresponding number of errors, wherein the measured size of the eye pattern is determined in relation to the calculated number of errors and the eye pattern signal indicates the corresponding calculated number of errors;
    detecting an error in the equalized serial data and providing a corresponding error detection;
    adjusting an equalizing strength provided by the adaptive equalizer to the received serial data in relation to the eye pattern signal; and
    following adjustment of the equalizing strength, determining a reset condition for the adaptive equalizer in relation to the error detection.

2. The method of claim 1, wherein determining the reset condition for the adaptive equalizer in relation to the error detection comprises:
    upon detecting an error in the equalized serial data, generating an error signal resetting the adaptive equalizer.

3. The method of claim 2, further comprising:
    de-serializing the equalized serial data to generate corresponding parallel data;
    wherein detecting the error in the equalized serial data comprises detecting an error in the parallel data.

4. The method of claim 3, wherein the detecting the error in the equalized serial data further comprises using a data pattern to detect the error in the parallel data.

5. The method of claim 4, wherein the receiver comprises an error detector functioning to detecting the error in the parallel data.

6. The method of claim 5, wherein the error detector uses an 8B10B decoder.

7. The method of claim 1, wherein equalizing the received serial data further comprises:
    shifting the at least one shift phase clock within a predetermined phase range in order to calculate the number of errors and measure the size of the eye pattern.

8. The method of claim 1, wherein equalizing the received serial data further comprises:
    adjusting the equalizing strength provided by the adaptive equalizer in order to maximize the size of the eye pattern using an iterative calculation method.

9. A receiver comprising:
    an adaptive equalizer receiving serial data and providing equalized serial data;
    an eye size measuring circuit configured to measure a size of an eye pattern associated with the equalized serial data and comprising:
        a first sampling circuit operating in synchronization with at least one of a plurality of recovery clocks having respectively different phases to first sample the equalized serial data, wherein the plurality of recovery clocks are recovered from the equalized serial data;
        a second sampling circuit shifting the at least one of the plurality of recovery clocks within a predetermined phase range in synchronization with at least one shift phase clock to second sample the equalized serial data; and
        an error measuring circuit comparing the first sample provided by the first sampling circuit with the second sampled provided by the second sampling circuit to calculate a number of errors;
    an error detector configured to detect an error in the equalized serial data; and
    a controller receiving an error signal indicative of the detected error and an eye pattern signal from the eye size measuring circuit and configured to generate a corresponding control signal applied to the adaptive equalizer to adaptively adjust an equalizing strength applied to the received serial data in response to the error signal,
    wherein the adaptive equalizer is configured to adaptively adjust an equalizing strength applied to the received serial data in accordance with the size of the eye pattern and to be reset in accordance with the detected error.

10. The receiver of claim 9, wherein the controller is further configured to generate the control signal in relation to the number of errors measured by the error measuring circuit.

11. The receiver of claim 10, wherein the control signal comprises a plurality of control bits indicating the measured size of the eye pattern.

12. The receiver of claim 10, wherein the controller is further configured to reset the adaptive equalizer in relation to the error signal.

13. The receiver of claim 10, wherein the error detector shifts the at least one shift phase clock within a predetermined phase range to calculate the number of errors.

14. The receiver of claim 13, wherein the adaptive equalizer adaptively adjusts the equalizing strength applied to the serial data in response to the control signal using an iterative calculation method.

15. The receiver of claim 9, wherein the error detector is further configured to detect the error in the equalized serial data using a data pattern.

16. The receiver of claim 15, wherein the error detector uses an 8B10B decoder.

* * * * *